UNITED STATES PATENT OFFICE.

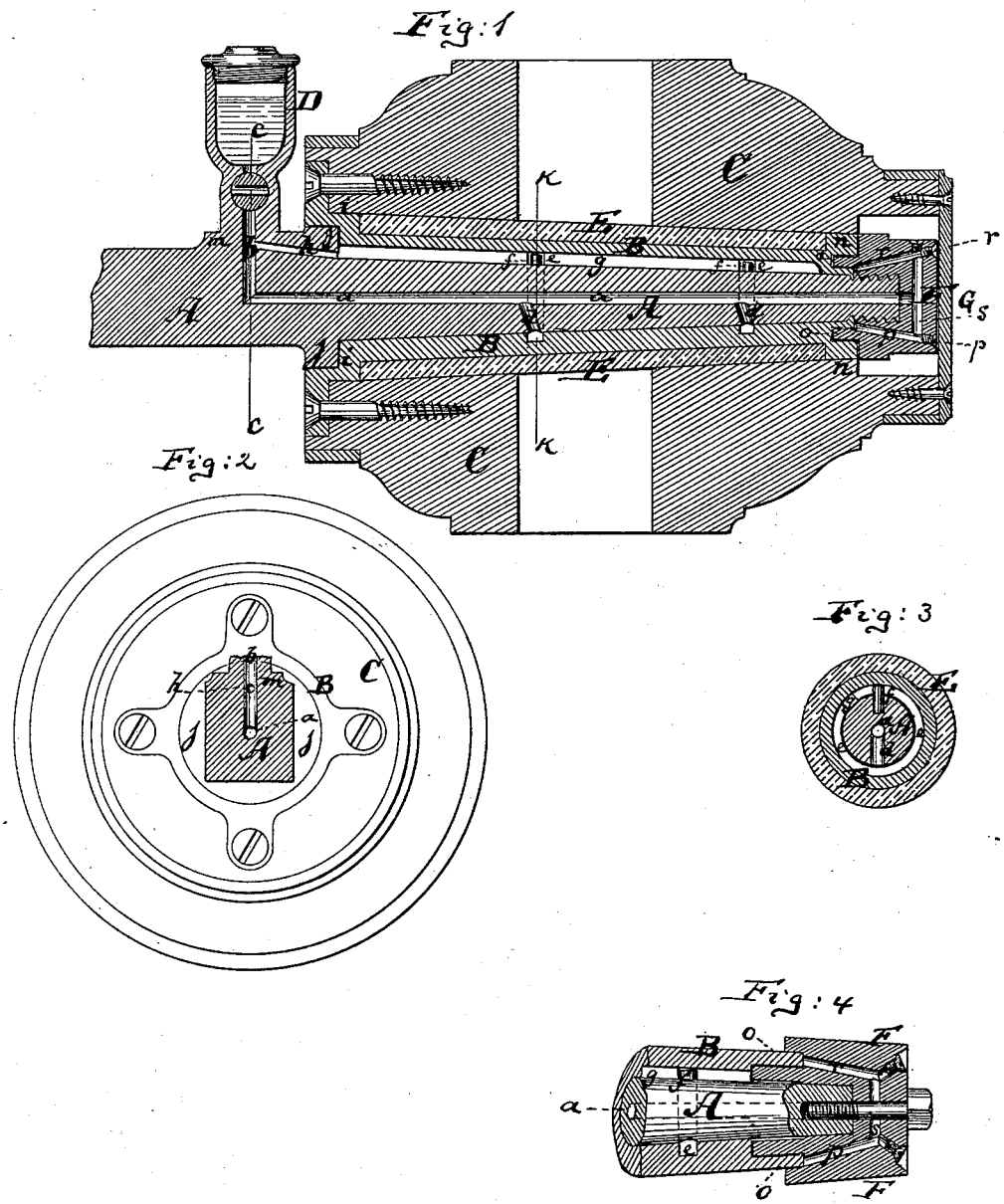

HANS H. E. BERY, OF BROOKLYN, NEW YORK.

WAGON-AXLE.

SPECIFICATION forming part of Letters Patent No. 300,197, dated June 10, 1884.

Application filed February 19, 1884. (No model.)

*To all whom it may concern:*

Be it known that I, HANS H. E. BERY, a resident of Brooklyn, in the county of Kings and State of New York, have invented an Improved Wagon-Axle, of which the following is a full, clear, and exact description, reference being made to the accompanying drawings, in which—

Figure 1 is a vertical longitudinal section of one end of my improved wagon-axle. Fig. 2 is a cross-section of the axle on the line *c c*, Fig. 1. Fig. 3 is a cross-section on the line *k k*, Fig. 1. Fig. 4 is a longitudinal section of a modification of the invention.

This invention relates to a new construction of axle for wagons and other wheeled vehicles, and of the parts that connect therewith; and the invention consists in providing the axle with certain grooves or channels, and in combining it with a certain grooved axle-box and with pins arranged to clean the grooves.

It also consists in a new construction of cap for the end of the axle, and in other details that will hereinafter be more fully stated.

In the accompanying drawings, the letter A represents the end of the axle. B is the axle-box; C, the hub. The axle has its end bored longitudinally to form a horizontal oil-channel, *a*, which extends to a vertical channel, *b*, which leads to a lubricator, D, which is secured upon the axle behind the axle-box, as shown. The channel *a* has downwardly-extending passages *d*, which lead to the space intervening between the axle and the axle-box. Where these passages *d* terminate the axle-box has circumferential grooves *e*. Into each of these grooves enters a pin, *f*, which projects from the axle. The axle-box also has a longitudinal inner groove or channel, *g*, which, when aligned with the pins *f*, allows the hub, with the axle-box, to be taken off or put on the axle. This groove *g* also communicates at its rear end with a passage, *h*, which is bored through the body of the axle, and which communicates with the lubricator D, as shown. The rear or inner end of the axle-box is made step-shaped, as shown in Fig. 1, so as to furnish a recess, *i*, into which enters a projecting collar, *j*, that is formed around the axle, as shown. This collar strengthens the axle, which is somewhat weakened by the apertures *a* and *h*, and furnishes also an abutment for the hub and axle-box, so that the latter cannot slide backward on the axle. The axle is also strengthened at the place where the lubricator D is put upon it by an enlargement, *m*, upon which the lubricator is set, as shown. The axle-box is by preference made with a projecting ring around its outer end, (said ring being marked *n* in the drawings,) so that the hub touches this axle-box at the ends of the same only, as shown in Fig. 1; and between the ends of the axle-box, which are raised, is inserted a ring, E, of leather, which is also in contact with the inner side of the hub, as shown, and which constitutes an elastic support for the hub, making the wheel run in a more yielding fashion than it would if the hub were more rigidly supported on the metal only of the axle-box. The front or outer end of the axle A has attached to it, by screw-thread or otherwise, a cap, F, which by preference has a tongue, *o*, entering an annular groove in the front of the axle-box, as shown in Fig. 1; or the tongue *o* may be on the axle-box, as in Fig. 4, entering an annular groove in the back portion of the cap F. The cap F has below its threaded portion a channel, *p*, which starts from the innermost end of the cap and extends forward to the outermost end thereof. In like manner this cap has a channel, *r*, above the axle, which also extends from the innermost to the outermost end of the cap. There is also a passage, *s*, in the cap F, which passage connects the channels *p* and *r*. Small screws close the ends of these channels *p r s*, and permit access to the same for cleaning, &c.

The operation of this axle, with its several attachments, is as follows: The lubricator D being filled with oil, and the valve which it may contain being opened, the oil flows through the upright passage *b* into the horizontal channel *a* and thence by the passages *d* into the circumferential inner groove, *e*, of the axle-box. As the wheel revolves on the axle the oil is carried around in these grooves and distributed, so that it may flow over the whole contact-space between the axle and the axle-box, properly lubricating the same. The pins *f*, entering the grooves *e*, will, when the wheel revolves, cause these grooves to be thoroughly cleaned, and prevent accumulation or clogging of oil in the same. Further distribution of oil is made through the passage $h$ and longitudinal channel $g$. Thus the lubrication of the bearing part of the axle is thoroughly provided for.

The cap F is not intended to be screwed or fastened to the end of the axle in such a manner that its joints shall be absolutely tight. On the contrary, these joints are to be such that oil from the passage $a$, and also from the passage $g$, and from the contact-surfaces of the axle and axle-box, can permeate through them and reach the channel $p$, whence it will reach communication with the end of the axle-box and contiguous end of the cap, lubricating these surfaces where they work against one another. If the oil should flow into the passage $p$ with too much freedom it will ascend in the passage $s$, and flow back in the passage $r$ into the space between the axle and axle-box. The passage $s$ may communicate directly with the passage $a$, as is shown in Fig. 1. The end of the hub has a plate, G, fastened to it, which conceals the cap F, as shown. The cap F can be used in the manner shown on axles that have no central channel and that have not the system of grooves hereinbefore described, and that are not combined with such an axle-box as has inner grooves such as herein described, for the cap will serve the purpose of lubricating the end of the axle in the manner stated, no matter of what construction the axle may be.

I also desire it to be understood that the arrangement of pins $f$ in the grooves $e$ has no necessary connection with an axle having central bore, for those pins will answer the purpose also on solid axles, provided the axle-box has the grooves $e$ and $g$.

I claim—

1. The axle A, having channels $a\ b\ d$ and passage $h$, leading to channel $b$, substantially as and for the purpose herein shown and described.

2. The combination of the axle with the axle-box B, having channels $e$ and $g$, and with the pins $f$, substantially as herein shown and described.

3. The combination of the axle A with the cap F, having passages $p\ s\ r$, and with the axle-box B, substantially as herein shown and described.

4. The combination of the axle A, having channels $a\ b\ d$, with the axle-box B, having channels $e$ and $g$, and with the pins $f$, substantially as herein shown and described.

HANS H. E. BERY.

Witnesses:
WILLY G. E. SCHULTZ,
ABBIE S. KENDALL.